(12) United States Patent
Chang et al.

(10) Patent No.: US 11,664,906 B2
(45) Date of Patent: May 30, 2023

(54) METHOD FOR CALIBRATING TRANSMITTER

(71) Applicants: Yuan-Shuo Chang, Hsinchu (TW); Tzu Ming Kao, Hsinchu (TW); REALTEK SEMICONDUCTOR CORPORATION, Hsinchu (TW)

(72) Inventors: Yuan-Shuo Chang, Hsinchu (TW); Tzu Ming Kao, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/410,546

(22) Filed: Aug. 24, 2021

(65) Prior Publication Data

US 2022/0158746 A1 May 19, 2022

(30) Foreign Application Priority Data

Nov. 16, 2020 (TW) ................................ 109139980

(51) Int. Cl.
*H04B 17/11* (2015.01)
*H04B 1/04* (2006.01)
*H04B 17/21* (2015.01)
*H04B 17/15* (2015.01)

(52) U.S. Cl.
CPC ........... *H04B 17/11* (2015.01); *H04B 1/0483* (2013.01); *H04B 17/15* (2015.01); *H04B 17/21* (2015.01)

(58) Field of Classification Search
CPC ...... H04B 17/11; H04B 17/15; H04B 1/0483; H04B 1/10; H04B 1/525; H04B 17/14; H04B 17/21; H04L 2027/0018
See application file for complete search history.

(56) References Cited

U.S. PATENT DOCUMENTS

| | | | | |
|---|---|---|---|---|
| 8,014,366 | B2 * | 9/2011 | Wax | H04W 72/046 455/562.1 |
| 8,280,327 | B2 | 10/2012 | Hsu et al. | |
| 9,008,161 | B1 * | 4/2015 | Chang | H04L 27/38 375/324 |
| 9,413,473 | B2 * | 8/2016 | Wang | H04L 25/06 |
| 9,749,172 | B2 * | 8/2017 | Chang | H04B 17/12 |
| 10,116,485 | B1 * | 10/2018 | Liu | H04B 17/354 |
| 10,225,118 | B1 * | 3/2019 | Hagiwara | H04L 27/0014 |

(Continued)

FOREIGN PATENT DOCUMENTS

TW    I536779 B    6/2016

*Primary Examiner* — Sophia Vlahos
(74) *Attorney, Agent, or Firm* — WPAT, P.C., Intellectual Property Attorneys; Anthony King (57) ABSTRACT

The present application provides a method for calibrating a transmitter. The transmitter includes an oscillator, a first signal path, and a second signal path. The first signal path and the second signal path include a first calibration unit preceding a first low pass filter and a second low pass filter, and a second calibration unit succeeding the first low pass filter and the second low pass filter. The calibration method includes: by configuring the first calibration unit and the second calibration unit and sending a transmission signal, and performing frequency analysis upon the transmission signal to obtain a frequency analysis result, to generate an optimized first compensation value for the first calibration unit and an optimized second compensation value for the second calibration unit.

20 Claims, 8 Drawing Sheets (56) References Cited

U.S. PATENT DOCUMENTS

| | | | |
|---|---|---|---|
| 10,812,294 B2* | 10/2020 | Tangudu | ............... H04L 25/022 |
| 2015/0118980 A1* | 4/2015 | Leung | ................... H04B 17/21 |
| | | | 455/114.2 |

* cited by examiner

METHOD FOR CALIBRATING TRANSMITTER

CROSS-REFERENCE TO RELATED APPLICATIONS

This application claims priority of Taiwan application No. 109139980 filed on Nov. 16, 2020, which is incorporated by reference in its entirety.

TECHNICAL FIELD

The present application relates to a calibration method; in particular, to a method capable of calibrating the local oscillator leakage in a transmitter.

BACKGROUND

When the local oscillator is not perfectly isolated from the mixer and low-noise amplifier at the transmitting end, leakage of the local oscillator signal may occur, which may interfere with the transmission signal. One conventional approach handles this issue by analyzing the components mixed from an original signal and a local oscillation signal leakage in a real signal generated by the I and Q signals' self-mixing and keep adjusting the compensation value accordingly until the best result is achieved. However, one drawback of this approach is time consuming. Therefore, how to compensate for the local oscillation signal leakage fast and accurately has become an essential issue in the field of communication systems.

SUMMARY OF THE INVENTION

The present application discloses a method for calibrating a transmitter, wherein the transmitter includes an oscillator, a first signal path, and a second signal path, wherein one of the first signal path and the second signal path is an in-phase signal path, the other of the first signal path and the second signal path is a quadrature signal path, the first signal path includes a first low pass filter, the second signal path includes a second low pass filter, the oscillator causes a first local oscillator leakage to a portion of the first signal path preceding the first low pass filter and a portion of the second signal path preceding the second low pass filter, the oscillator causes a second local oscillator leakage to a portion of the first signal path succeeding the first low pass filter and a portion of the second signal path succeeding the second low pass filter, and the first signal path and the second signal path includes thereon a first calibration unit and a second calibration unit, wherein the first calibration unit is disposed preceding the first low pass filter and the second low pass filter, the first calibration unit is set with a first compensation value, the second calibration unit is disposed succeeding the first low pass filter and the second low pass filter, and the second calibration unit is set with a second compensation value; the method including: setting the first compensation value to zero and the second compensation value to a first preset value, and passing a single-frequency signal through the transmitter to generate a first transmission signal; looping back the first transmission signal and performing a spectrum analysis on the first transmission signal to obtain a first spectrum analysis result; setting the first compensation value to zero and the second compensation value to a second preset value, and passing the single-frequency signal through the transmitter to generate a second transmission signal; looping back the second transmission signal and performing a spectrum analysis on the second transmission signal to obtain a second spectrum analysis result; reversing signs of gains of the first low pass filter and the second low pass filter, setting the first compensation value to zero and the second compensation value to the first preset value, and passing the single-frequency signal through the transmitter to generate a third transmission signal; looping back the third transmission signal and performing a spectrum analysis on the third transmission signal to obtain a third spectrum analysis result; reversing signs of gains of the first low-pass filter and the second low-pass filter, setting the first compensation value to zero and the second compensation value to the second preset value, and passing the single-frequency signal through the transmitter to generate a fourth transmission signal; looping back the fourth transmission signal and performing a spectrum analysis on the fourth transmission signal to obtain a fourth spectrum analysis result; and optimizing the second compensation value based on the first spectrum analysis result, the second spectrum analysis result, the third spectrum analysis result; the fourth spectrum analysis result, the first preset value, and the second preset value to generate an optimal second compensation value.

The present application discloses a method for calibrating a transmitter, wherein the transmitter includes an oscillator, a first signal path, and a second signal path, wherein one of the first signal path and the second signal path is an in-phase signal path, the other of the first signal path and the second signal path is a quadrature signal path, the first signal path comprises a first low pass filter, the second signal path comprises a second low pass filter, the oscillator causes a first local oscillator leakage to a portion of the first signal path preceding the first low pass filter and a portion of the second signal path preceding the second low pass filter, the oscillator causes a second local oscillator leakage to a portion of the first signal path succeeding the first low pass filter and a portion of the second signal path succeeding the second low pass filter, and the first signal path and the second signal path include thereon a first calibration unit and a second calibration unit, wherein the first calibration unit is disposed preceding the first low pass filter and the second low pass filter, the first calibration unit is set with a first compensation value, the second calibration unit is disposed succeeding the first low pass filter and the second low pass filter, and the second calibration unit is set with a second compensation value; the method including: setting the first compensation value to a first preset value and the second compensation value to zero, and passing a single-frequency signal through the transmitter to generate a first transmission signal; looping back the first transmission signal and performing a spectrum analysis on the first transmission signal to obtain a first spectrum analysis result; setting the first compensation value to a second preset value and the second compensation value to zero, and passing the single-frequency signal through the transmitter to generate a second transmission signal; looping back the second transmission signal and performing a spectrum analysis on the second transmission signal to obtain a second spectrum analysis result; reversing signs of gains of the first low pass filter and the second low pass filter, setting the first compensation value to the first preset value and the second compensation value to zero, and passing the single-frequency signal through the transmitter to generate a third transmission signal; looping back the third transmission signal and performing a spectrum analysis on the third transmission signal to obtain a third spectrum analysis result; reversing signs of gains of the first low-pass titter and the second low-pass filter, setting the first compensation value to the second preset value and the second compensation value to zero, and passing the single-frequency signal through the transmitter to generate a fourth transmission signal; looping back the fourth transmission signal and performing a spectrum analysis on the fourth transmission signal to obtain a fourth spectrum analysis result; and optimizing the first compensation value based on the first spectrum analysis result, the second spectrum analysis result, the third spectrum analysis result, the fourth spectrum analysis result, the first preset value, and the second preset value to generate an optimal first compensation value.

The present application discloses a method for calibrating a transmitter, wherein the transmitter includes an oscillator, a first signal path, and a second signal path, wherein one of the first signal path and the second signal path is an in-phase signal path, the other of the first signal path and the second signal path is a quadrature signal path, the first signal path comprises a first low pass filter, the second signal path comprises a second low pass filter, the oscillator causes a first local oscillator leakage to a portion of the first signal path preceding the first low pass filter and a portion of the second signal path preceding the second low pass filter, the oscillator causes a second local oscillator leakage to a portion of the first signal path succeeding the first low pass filter and a portion of the second signal path succeeding the second low pass filter, and the first signal path and the second signal path include thereon a first calibration unit and a second calibration unit, wherein the first calibration unit is disposed preceding the first low pass filter and the second low pass filter, the first calibration unit is set with a first compensation value, the second calibration unit is disposed succeeding the first low pass filter and the second low pass filter, and the second calibration unit is set with a second compensation value; the method including: configuring gains of the first low pass filter and the second low pass filter as a first gain, and setting the first compensation value to zero and the second compensation value to a first preset value, and passing a single-frequency signal through the transmitter to generate a first transmission signal; looping back the first transmission signal and performing a spectrum analysis on the first transmission signal to obtain a first spectrum analysis result; configuring gains of the first low pass filter and the second low pass filter as the first gain, and setting the first compensation value to zero and the second compensation value to a second preset value, and passing the single-frequency signal through the transmitter to generate a second transmission signal; looping back the second transmission signal and performing a spectrum analysis on the second transmission signal to obtain a second spectrum analysis result; and optimizing the second compensation value based on the first spectrum analysis result, the second spectrum analysis result, the first preset value, and the second preset value to generate a first leading optimal value.

The above calibration method calibrates a baseband circuit and a front-end modulation circuit of a transmitter to compensate local oscillator leakage.

DETAILED DESCRIPTION

Figure 1:
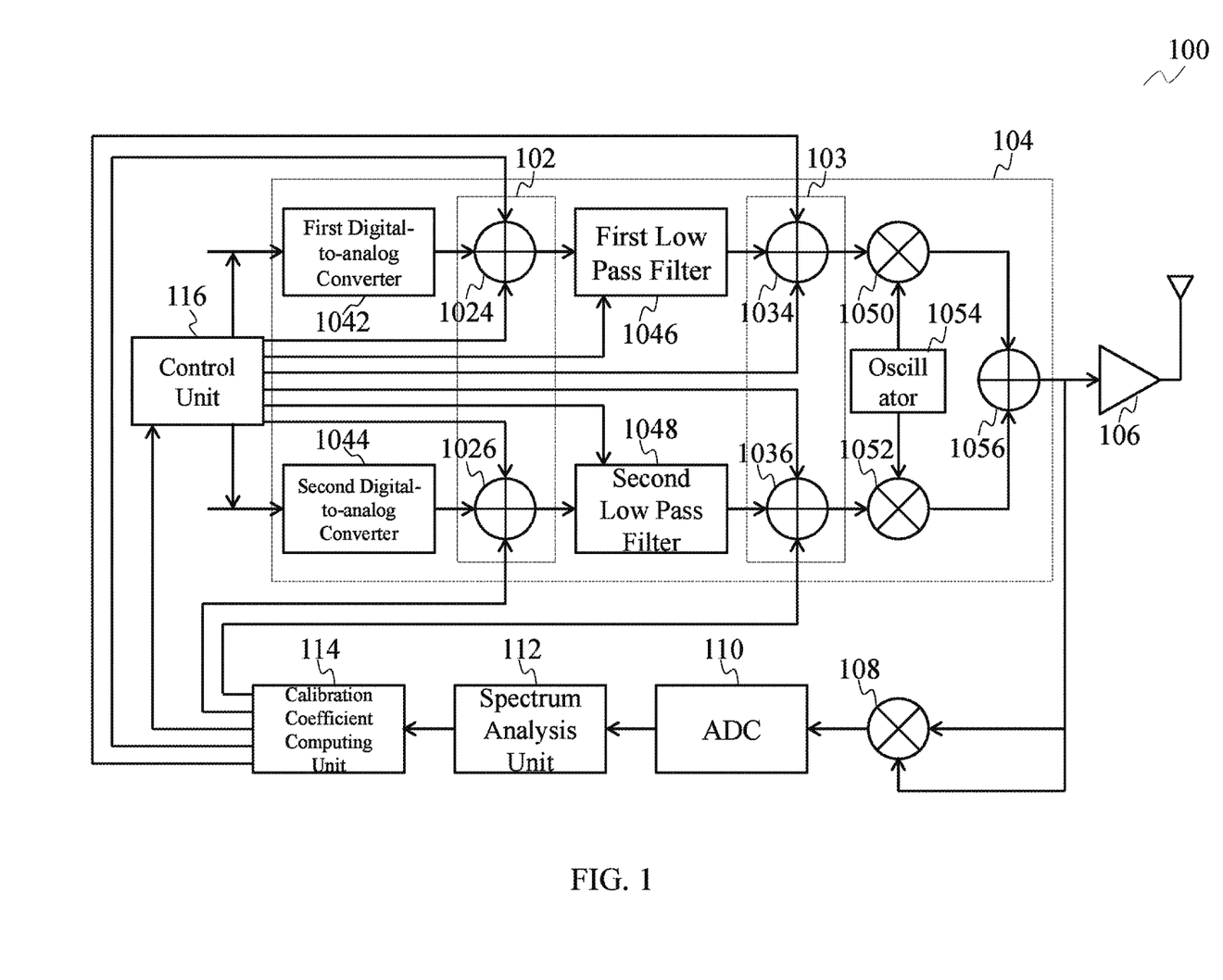
FIG. 1 is a schematic diagram illustrating a transmitter according to some embodiments of the present application.

FIG. 1 is a schematic diagram illustrating a transmitter according to some embodiments of the present disclosure, wherein the transmitter 100 includes a first signal path and a second signal path, wherein one of the two signal paths is an in-phase (I) signal path, and the other of the two signal paths is a quadrature (Q) signal path.

As shown in FIG. 1, the transmitter 100 includes a transmitting end 104, a power amplifier 106, a self-mixer 108, an analog to digital converter (ADC) 110, a spectrum analysis unit 112, a calibration coefficient computing unit 114, and a control unit 116, wherein the transmitting end 104 includes a first signal path, a second signal path and an adder 1056; for example, the first signal path is an in-phase signal path and passes through a first digital-to-analog converter 1042, a first low pass filter 1046, and a first mixer 1050; the second signal path is a quadrature signal path and passes through a second digital-to-analog converter 1044, a second low pass filter 1048, and a second mixer 1052.

In the present embodiment, after each time the transmitter 100 is restarted (e.g., after power-on or after a system reset) and before the normal data transmission mode is officially started, in order to mitigate the local oscillator leakage caused by the oscillator 1054 so as to reduce the interference to the transmission signal, the transmitter 100 will first enter a calibration parameter computation mode; in other words, in the calibration parameter computation mode, the transmission signal of the transmitter 100 is looped back to the self-mixer 108 and passed through the DAC ADC 110, the spectrum analysis unit 112, and the calibration coefficient computing unit 114, so as to compute an optimal calibration parameter concerning the leakage issue of the oscillator 1054, and then, the transmitting end 104 enters the normal data transmission mode. In the normal data transmission mode, the transmission signal is no longer looped back to the self-mixer 108, and the calibration parameter obtained during the calibration parameter computation mode is used for official data transmission and reception.

Specifically, the present embodiment additionally incorporates a first calibration unit 102 and a second calibration unit 103 for the transmitting end 104 of the transmitter 100, wherein the first calibration unit 102 includes adders 1024 and 1026, which are configured to use a compensation value DBC to compensate for the leakage DB generated by the oscillator 1054 and introduced to the circuit (that is, the corresponding baseband circuit) preceding the first low pass filter 1046 and the second low pass filter 1048; the second calibration unit 103 includes adders 1034 and 1036, which are configured to use a compensation value DMC to compensate for the leakage DM generated by the oscillator 1054 and introduced to the circuit (that is, the corresponding front-end modulation circuit) succeeding the first low pass filter 1046 and the second low pass filter 1048. It should be noted that, in practice, the adders 1024, 1026, 1034, and 1036 can be implemented using ways such as a current digital-to-analog converter (IDAC), and that the leakage and compensation value mentioned in the present disclosure are complex numbers, with the real and imaginary parts corresponding to the I-path and Q-path respectively.

The advantage of the present disclosure to compensate for the oscillator leakage of the circuit preceding and succeeding the first low-pass filter 1046 and the second low-pass filter 1048, respectively, is that the signal generated by the baseband circuit can enter the front-end modulation circuit under the situation that the leakage DB has been compensated, so that the leakage DM in the front-end modulation circuit does not contain the leakage DB component and the leakage DB will not be amplified by the gain of the front-end modulation circuit. The methods for obtaining the optimal value DMCT of the compensation value DMC and the optimal value DBCT of the compensation value DBC are described below.

Step 202 to Step 216 are a first embodiment of the present disclosure for computing DMCT and DBCT in the calibration parameter computation mode. Reference is made to FIG. 1, in Step 202, the control unit 116 sets the compensation value DBC of the first calibration unit 102 to 0 and sets the compensation value DMC of the second calibration unit 103 to DMC1; after that, the control unit 116 inputs a single-frequency test signal with a frequency w; then the spectrum analysis unit 112 performs Fourier transform with respect to −w, and the result P1 of Fourier transform (i.e., the energy power at the frequency −w) can be expressed as:

$$P1 \propto G^*DB+(DM+DMC1) \tag{1}$$

where G is the gain caused by the first low pass filter 1046 and the second low pass filter 1048 to the single-frequency test signal, the symbol ∝ indicates proportional relation.

In Step 204, the control unit 116 sets the compensation value DBC of the first calibration unit 102 to 0 and sets the compensation value DMC of the second calibration unit 103 to a DMC2 that is different from DMC1; after that, the control unit 116 inputs a single-frequency test signal with a frequency w; then the spectrum analysis unit 112 performs Fourier transform with respect to −w, and the result P2 can be expressed as:

$$P3 \propto -G^*DB+(DM+DMC1) \tag{3}$$

In Step 208, reverse signs of gains of the first low pass filter 1046 and the second low pass filter 1048, and repeat Step 204; then the spectrum analysis unit 112 performs Fourier transform with respect to −w, and the result P4 can be expressed as:

$$P4 \propto -G^*DB+(DM+DMC2) \tag{4}$$

In Step 210, the calibration coefficient computing unit 114 sums up P1 and P3, and sums up P2 and P4, thereby respectively obtaining:

$$(P1+P3) \propto (DM+DMC1) \tag{5}$$

$$(P2+P4) \propto (DM+DMC2) \tag{6}$$

Figure 2:
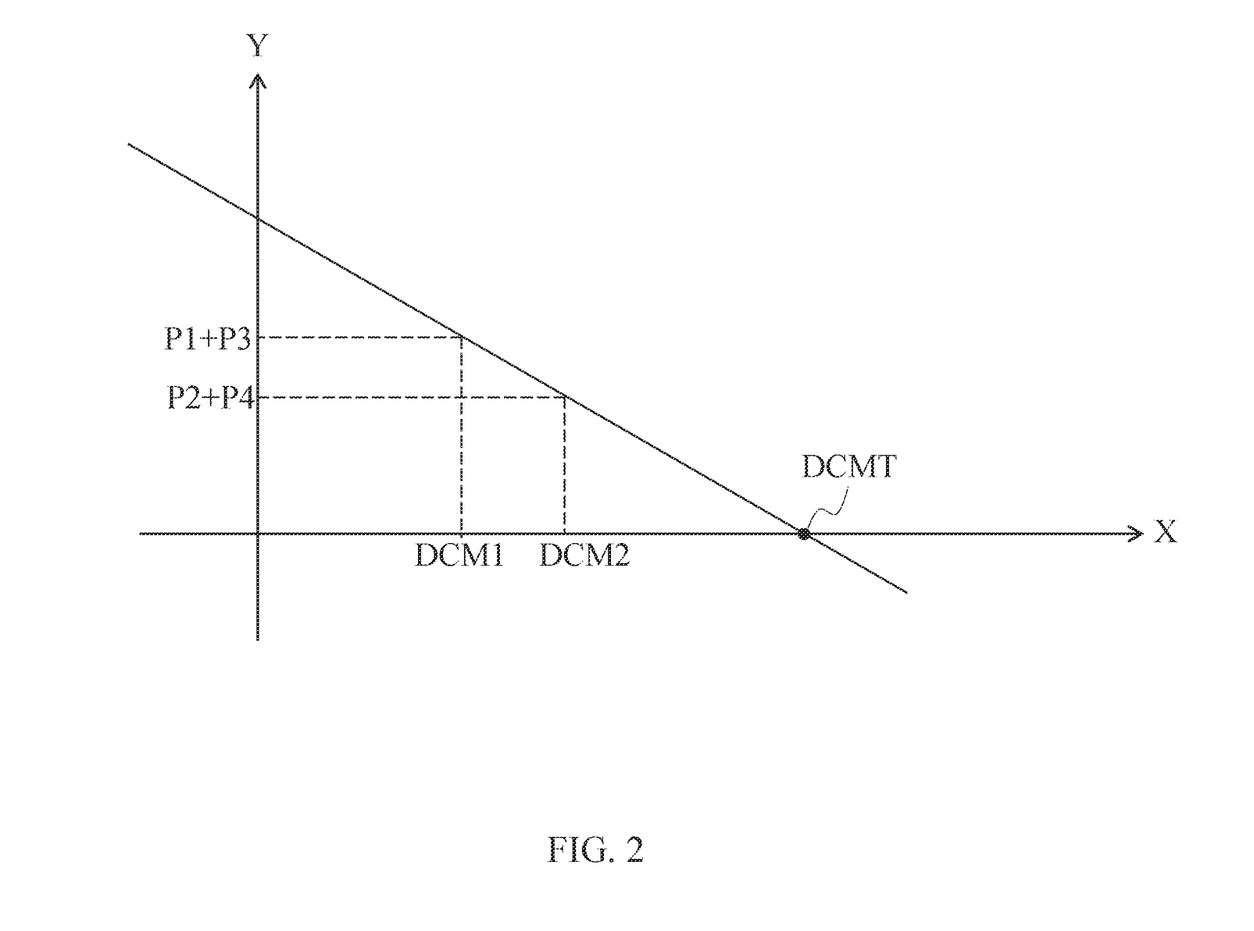
FIG. 2 is a schematic diagram illustrating the calculation of an optimal compensation value using linear extrapolation or linear interpolation.

Since the leakage DM that the oscillator 1054 causes in the front-end modulation circuit is a fixed value, DMC1, DMC2 and (P1+P3),(P2+P4) in equations (5) and (6) are in linear relation. Therefore, the calibration coefficient computing unit 114 can estimate the optimal compensation value DMCT using linear extrapolation or linear interpolation. As shown in FIG. 2, one can obtain a straight line by connecting the two points of DMC1, DMC2, (P1+P3) and (P2+P4) in the two-dimensional coordinate; then, extend the straight line to the X-axis, and the intersecting point is the DMCT. It should be noted that in FIG. 2, the concept of this embodiment is simplified to two dimensions to facilitate the understanding, whereas the actual situation is four dimensions.

In Step 212, the control unit 116 sets the compensation value DMC of the second calibration unit 103 to DMCT so as to compensate for the leakage DM in the front-end modulation circuit perfectly, and sets the compensation value DBC of the first calibration unit 102 to DBC1; after that, the control unit 116 inputs a single-frequency test signal with a frequency w; then the spectrum analysis unit 112 performs Fourier transform with respect to −w, and the result P5 can be expressed as:

$$P5 \propto G^*(DB+DBC1) \tag{7}$$

In Step 214, the control unit 116 sets the compensation value DMC of the second calibration unit 103 to DMCT, and sets the compensation value DBC of the first calibration unit 102 to DBC2 that is different from DBC1; after that, the control unit 116 inputs a single-frequency test signal with a frequency w; then the spectrum analysis unit 112 performs Fourier transform with respect to −w, and the result P1 can be expressed as:

$$P6 \propto G^*(DB+DBC2) \tag{8}$$

In Step 216, since the leakage DB that is caused by the oscillator 1054 in the baseband circuit is a fixed value, DBC1, DBC2 and P5, P6 in equations (7) and (8) are in linear relation. Therefore, the calibration coefficient computing unit 114 can compute the optimal compensation value DBCT using linear extrapolation or linear interpolation.

Step 302 to Step 316 are a second embodiment of the present application for computing DMCT and DBCT in the calibration parameter computation mode. The difference between the second embodiment and the first embodiment is that in the second embodiment, DBCT is computed before DMCT. Reference is made to FIG. 1, in Step 302, the control unit 116 sets the compensation value DMC of the second calibration unit 103 to 0 and sets DBC of the first calibration unit 102 to DBC3; after that, the control unit 116 inputs a single-frequency test signal with a frequency w; then the spectrum analysis unit 112 performs Fourier transform with respect to −w, and the result P7 can be expressed as:

$$P7 \propto G^*(DB+DBC3)+DM \tag{9}$$

In Step 304, the control unit 116 sets the compensation value DMC of the second calibration unit 103 to 0, and sets the compensation value DBC of the first calibration unit 102 to DBC4 that is different from DBC3; after that, the control unit 116 inputs a single-frequency test signal with a frequency w; then the spectrum analysis unit 112 performs Fourier transform with respect to −w, and the result P8 can be expressed as:

$$P8 \propto G^*(DB+DBC4)+DM \tag{10}$$

In Step 306, reverse signs of gains of the first low pass filter 1046 and the second low pass filter 1048, and repeat Step 302; then the spectrum analysis unit 112 performs Fourier transform with respect to −w, and the result P9 can be expressed as:

$$P9 \propto -G^*(DB+DBC3)+DM \tag{11}$$

In Step 308, reverse signs of gains of the first low pass filter 1046 and the second low pass filter 1048, and repeat Step 304; then the spectrum analysis unit 112 performs Fourier transform with respect to −w, and the result P4 can be expressed as:

$$P10 \propto -G^*(DB+DBC4)+DM \tag{12}$$

In Step 310, the calibration coefficient computing unit 114 subtracts P9 from P7, and subtracts P10 from P8, thereby respectively obtaining:

$$(P7-P9) \propto 2G(DB+DBC3) \quad (13)$$

$$(P8-P10) \propto 2G(DB+DBC4) \quad (14)$$

The calibration coefficient computing unit 114 can compute the optimal compensation value DBCT using linear extrapolation or linear interpolation.

In Step 312, the control unit 116 sets the compensation value DBC of the first calibration unit 102 to DBCT to compensate for the leakage DB in the baseband circuit perfectly, and sets the compensation value DMC of the second calibration unit 103 to DMC3; after that the control unit 116 inputs a single-frequency test signal with a frequency w; then the spectrum analysis unit 112 performs Fourier transform with respect to −w, and the result P11 can be expressed as:

$$P11 \propto (DM+DMC3) \quad (15)$$

In Step 314, the control unit 116 sets the compensation value DBC of the first calibration unit 102 to DBCT to compensate for the leakage DB in the baseband circuit perfectly, and sets the compensation value DMC of the second calibration unit 103 to DMC4 that is different from DMC3; after that the control unit 116 inputs a single-frequency test signal with a frequency w; then the spectrum analysis unit 112 performs Fourier transform with respect to −w, and the result P12 can be expressed as:

$$P12 \propto (DM+DMC4) \quad (16)$$

In Step 316, the calibration coefficient computing unit 114 can compute the optimal compensation value DMCT using linear extrapolation or linear interpolation.

Step 402 to Step 416 are a third embodiment of the present disclosure for computing DMCT and DBCT in the calibration parameter computation mode. Reference is made to FIG. 1, in Step 402, the control unit 116 sets the gain of the first low pass filter 1046 and the second low pass filter 1048 to G1, and sets the compensation value DBC of the first calibration unit 102 to 0, and sets the compensation value DMC of the second calibration unit 103 to DMC5; after that the control unit 116 inputs a single-frequency test signal with a frequency w; then the spectrum analysis unit 112 performs Fourier transform with respect to −w, and the result P13 can be expressed as:

$$P13 \propto G1*DB+DM+DMC5 \quad (17)$$

In Step 404, the control unit 116 sets the gain of the first low pass filter 1046 and the second low pass filter 1048 to G1, and sets the compensation value DBC of the first calibration unit 102 to 0, and sets the compensation value DMC of the second calibration unit 103 to DMC6 that is different from DMC5; after that the control unit 116 inputs a single-frequency test signal with a frequency w; then the spectrum analysis unit 112 performs Fourier transform with respect to −w, and the result P14 can be expressed as:

$$P14 \propto G1*DB+DM+DMC6 \quad (18)$$

In Step 406, since DM and DB that the oscillator 1054 causes are fixed values, DMC5, DMC6 and P13, P14 in equations (17) and (18) are in linear relation. Therefore, by using linear extrapolation or linear interpolation, the calibration coefficient comput unit 114 can estimate a compensation value DM, referred to as a leading optimal value DMPT1, that compensates for DB and DM simultaneously when the gain of the first low pass filter 1046 and the second low pass filter 1048 is G1, and causes:

$$G1*DB+(DM+DMPT1)=0 \quad (19)$$

In Step 408, the control unit 116 sets the gain of the first low pass filter 1046 and the second low pass filter 1048 to G2, and the remaining step is the same as Step 402; then the spectrum analysis unit 112 performs Fourier transform with respect to −w, and the result P15 can be expressed as:

$$P15 \propto G2*DB+DM+DMC5 \quad (20)$$

In Step 410, the control unit 116 sets the gain of the first low pass filter 1046 and the second low pass filter 1048 to G2, and the remaining step is the same as Step 404; then the spectrum analysis unit 112 performs Fourier transform with respect to −w, and the result P16 can be expressed as:

$$P16 \propto G2*DB+DM+DMC6 \quad (21)$$

In Step 412, by using linear extrapolation or linear interpolation, the calibration coefficient comput unit 114 can estimate a compensation value DM, referred to as a leading optimal value DMPT2, that compensates for DB and DM simultaneously when the gain of the first low pass filter 1046 and the second low pass filter 1048 is G2, and causes:

$$G2*DB+(DM+DMPT2)=0 \quad (22)$$

In Step 414, the calibration coefficient computing unit 114 can obtain the following equations according to equations (19) and (22):

$$DB = \frac{DMPT2 - DMPT1}{G1 - G2} \quad (23)$$

$$DM = \frac{G2*DMPT1 - G1*DMPT2}{G1 - G2} \quad (24)$$

that is:

$$DBCT = -\frac{DMPT2 - DMPT1}{G1 - G2} \quad (25)$$

$$DMCT = \frac{G2*DMPT1 - G1*DMPT2}{G1 - G2} \quad (26)$$

Figure 3:
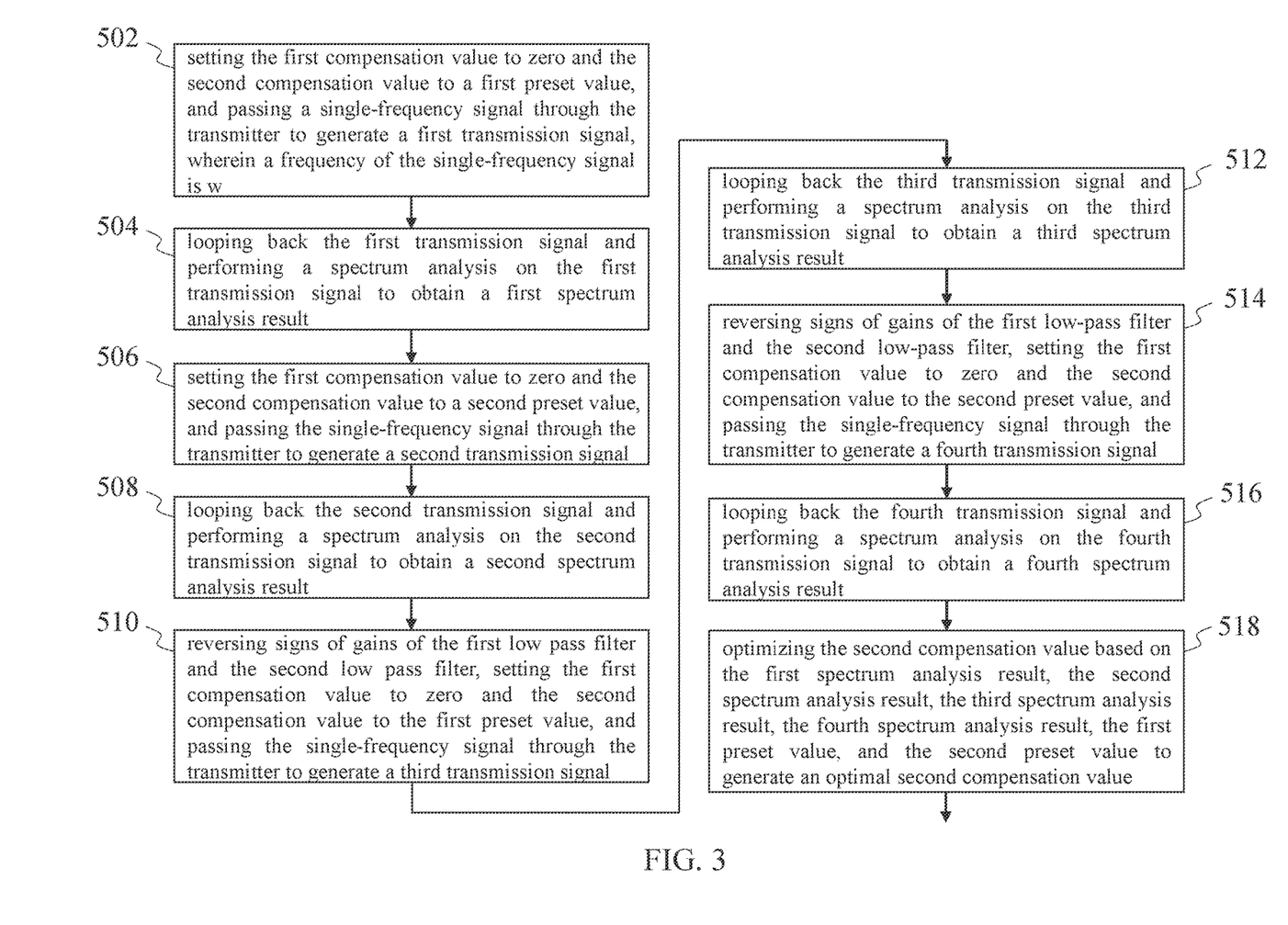
FIG. 3 to FIG. 4 are flow charts illustrating a method for calibrating a transmitter according to a first embodiment of the present application.
Figure 4:
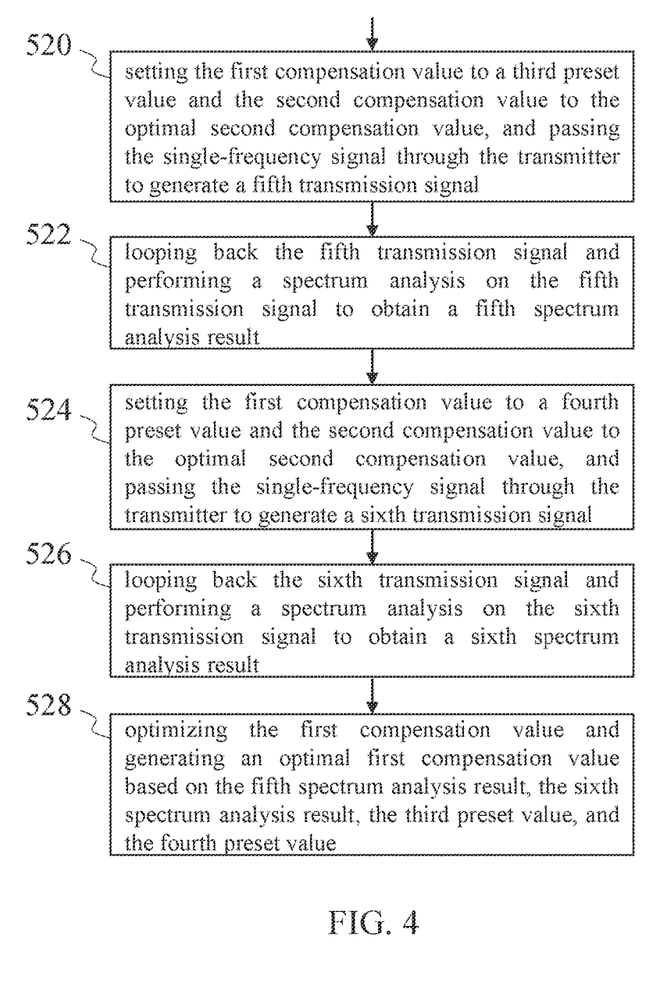

FIG. 3 to FIG. 4 are flow charts illustrating a method for calibrating a transmitter according to a first embodiment of the present application. The transmitter includes an oscillator, a first signal path, and a second signal path, wherein one of the first signal path and the second signal path is an in-phase signal path, the other of the first signal path and the second signal path is a quadrature signal path, the first signal path includes a first low pass filter, the second signal path includes a second low pass filter, the oscillator causes a first local oscillator leakage to a portion of the first signal path preceding the first low pass filter and a portion of the second signal path preceding the second low pass filter, the oscillator causes a second local oscillator leakage to a portion of the first signal path succeeding the first low pass filter and a portion of the second signal path succeeding the second low pass filter, and the first signal path and the second signal path includes thereon a first calibration unit and a second calibration unit, wherein the first calibration unit is disposed preceding the first low pass filter and the second low pass filter, the first calibration unit is set with a first compensation value, the second calibration unit is disposed succeeding the first low pass filter and the second low pass filter, and the second calibration unit is set with a second compensation value; the method including: setting the first compensation value to zero and the second compensation value to a first preset value, and passing a single-frequency signal through the transmitter to generate a first transmission signal, wherein a frequency of the single-frequency signal is w (502); looping back the first transmission signal and performing a spectrum analysis on the first transmission signal to obtain a first spectrum analysis result (504); setting the first compensation value to zero and the second compensation value to a second preset value, and passing the single-frequency signal through the transmitter to generate a second transmission signal (506); looping back the second transmission signal and performing a spectrum analysis on the second transmission signal to obtain a second spectrum analysis result (508); reversing signs of gains of the first low pass filter and the second low pass filter, setting the first compensation value to zero and the second compensation value to the first preset value, and passing the single-frequency signal through the transmitter to generate a third transmission signal (510); looping back the third transmission signal and performing a spectrum analysis on the third transmission signal to obtain a third spectrum analysis result (512); reversing signs of gains of the first low-pass filter and the second low-pass filter, setting the first compensation value to zero and the second compensation value to the second preset value, and passing the single-frequency signal through the transmitter to generate a fourth transmission signal (514); looping back the fourth transmission signal and performing a spectrum analysis on the fourth transmission signal to obtain a fourth spectrum analysis result (516); optimizing the second compensation value based on the first spectrum analysis result, the second spectrum analysis result, the third spectrum analysis result, the fourth spectrum analysis result, the first preset value, and the second preset value to generate an optimal second compensation value (518); setting the first compensation value to a third preset value and the second compensation value to the optimal second compensation value, and passing the single-frequency signal through the transmitter to generate a fifth transmission signal (520); looping back the fifth transmission signal and performing a spectrum analysis on the fifth transmission signal to obtain a fifth spectrum analysis result (522); setting the first compensation value to a fourth preset value and the second compensation value to the optimal second compensation value, and passing the single-frequency signal through the transmitter to generate a sixth transmission signal (524); looping back the sixth transmission signal and performing a spectrum analysis on the sixth transmission signal to obtain a sixth spectrum analysis result (526); and optimizing the first compensation value and generating an optimal first compensation value based on the fifth spectrum analysis result, the sixth spectrum analysis result, the third preset value, and the fourth preset value (528).

Figure 5:
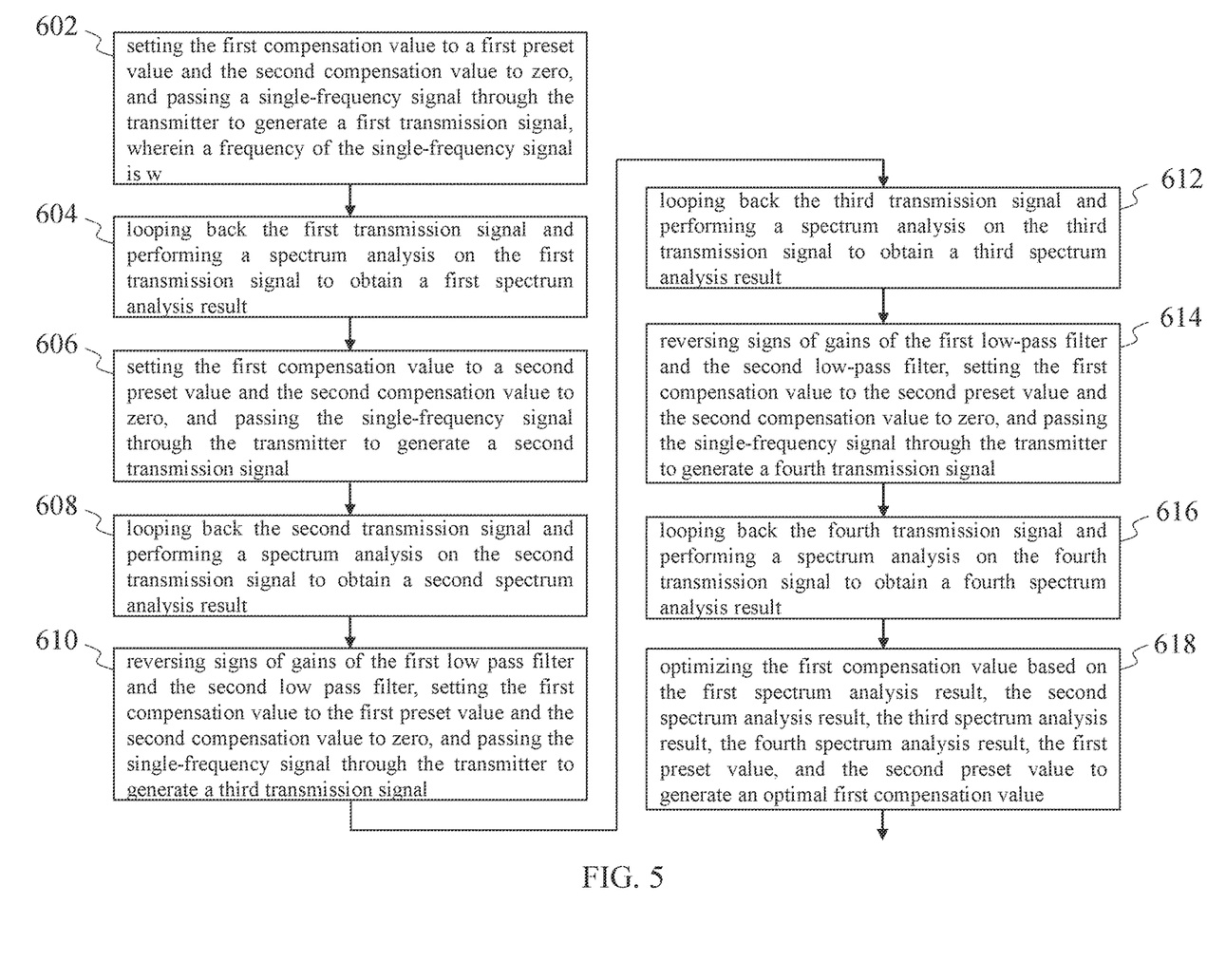
FIG. 5 to FIG. 6 are flow charts illustrating a method for calibrating a transmitter according to a second embodiment of the present application.
Figure 6:
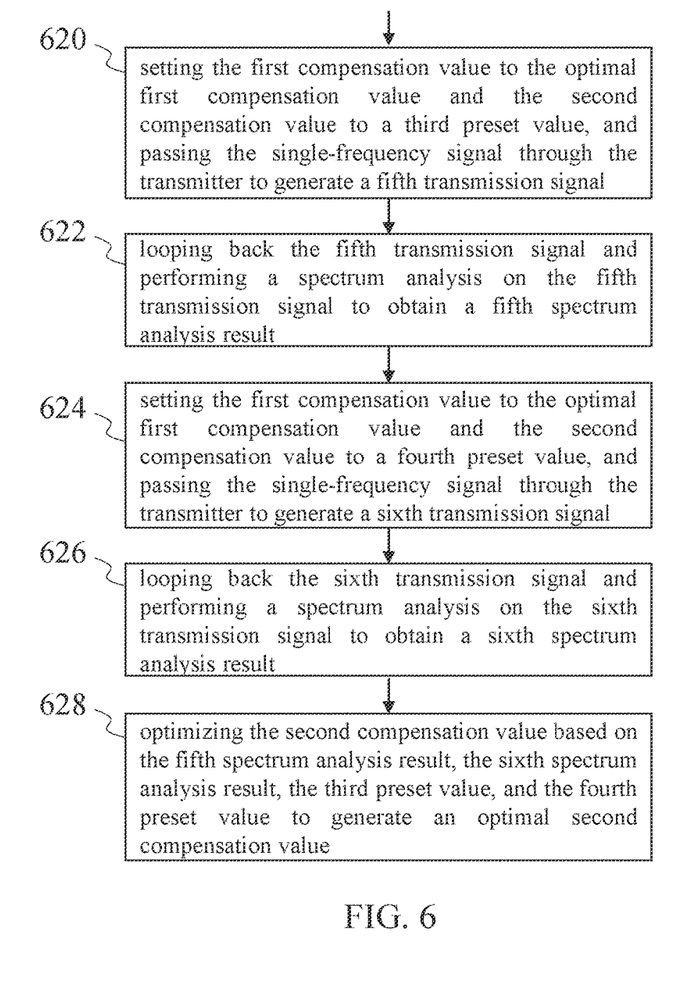

FIG. 5 to FIG. 6 are flow charts illustrating a method for calibrating a transmitter according to a second embodiment of the present application. The transmitter includes an oscillator, a first signal path, and a second signal path, wherein one of the first signal path and the second signal path is an in-phase signal path, the other of the first signal path and the second signal path is a quadrature signal path, the first signal path includes a first low pass filter, the second signal path includes a second low pass filter, the oscillator causes a first local oscillator leakage to a portion of the first signal path preceding the first low pass filter and a portion of the second signal path preceding the second low pass filter, the oscillator causes a second local oscillator leakage to a portion of the first signal path succeeding the first low pass filter and a portion of the second signal path succeeding the second low pass filter, and the first signal path and the second signal path include thereon a first calibration unit and a second calibration unit, wherein the first calibration unit is disposed preceding the first low pass filter and the second low pass filter, the first calibration unit is set with a first compensation value, the second calibration unit is disposed succeeding the first low pass filter and the second low pass filter, and the second calibration unit is set with a second compensation value; the method including: setting the first compensation value to a first preset value and the second compensation value to zero, and passing a single-frequency signal through the transmitter to generate a first transmission signal, wherein a frequency of the single-frequency signal is w (602); looping back the first transmission signal and performing a spectrum analysis on the first transmission signal to obtain a first spectrum analysis result (604); setting the first compensation value to a second preset value and the second compensation value to zero, and passing the single-frequency signal through the transmitter to generate a second transmission signal (606); looping back the second transmission signal and performing a spectrum analysis on the second transmission signal to obtain a second spectrum analysis result (608); reversing signs of gains of the first low pass filter and the second low pass filter, setting the first compensation value to the first preset value and the second compensation value to zero, and passing the single-frequency signal through the transmitter to generate a third transmission signal (610); looping back the third transmission signal and performing a spectrum analysis on the third transmission signal to obtain a third spectrum analysis result (612); reversing signs of gains of the first low-pass filter and the second low-pass filter, setting the first compensation value to the second preset value and the second compensation value to zero, and passing the single-frequency signal through the transmitter to generate a fourth transmission signal (614); looping back the fourth transmission signal and performing a spectrum analysis on the fourth transmission signal to obtain a fourth spectrum analysis result (616); optimizing the first compensation value based on the first spectrum analysis result, the second spectrum analysis result, the third spectrum analysis result, the fourth spectrum analysis result, the first preset value, and the second preset value to generate an optimal first compensation value (618); setting the first compensation value to the optimal first compensation value and the second compensation value to a third preset value, and passing the single-frequency signal through the transmitter to generate a fifth transmission signal (620); looping back the fifth transmission signal and performing a spectrum analysis on the fifth transmission signal to obtain a fifth spectrum analysis result (622); setting the first compensation value to the optimal first compensation value and the second compensation value to a fourth preset value, and passing the single-frequency signal through the transmitter to generate a sixth transmission signal (624); looping back the sixth transmission signal and performing a spectrum analysis on the sixth transmission signal to obtain a sixth spectrum analysis result (626); and optimizing the second compensation value based on the fifth spectrum analysis result, the sixth spectrum analysis result, the third preset value, and the fourth preset value to generate an optimal second compensation value (628).

Figure 7:
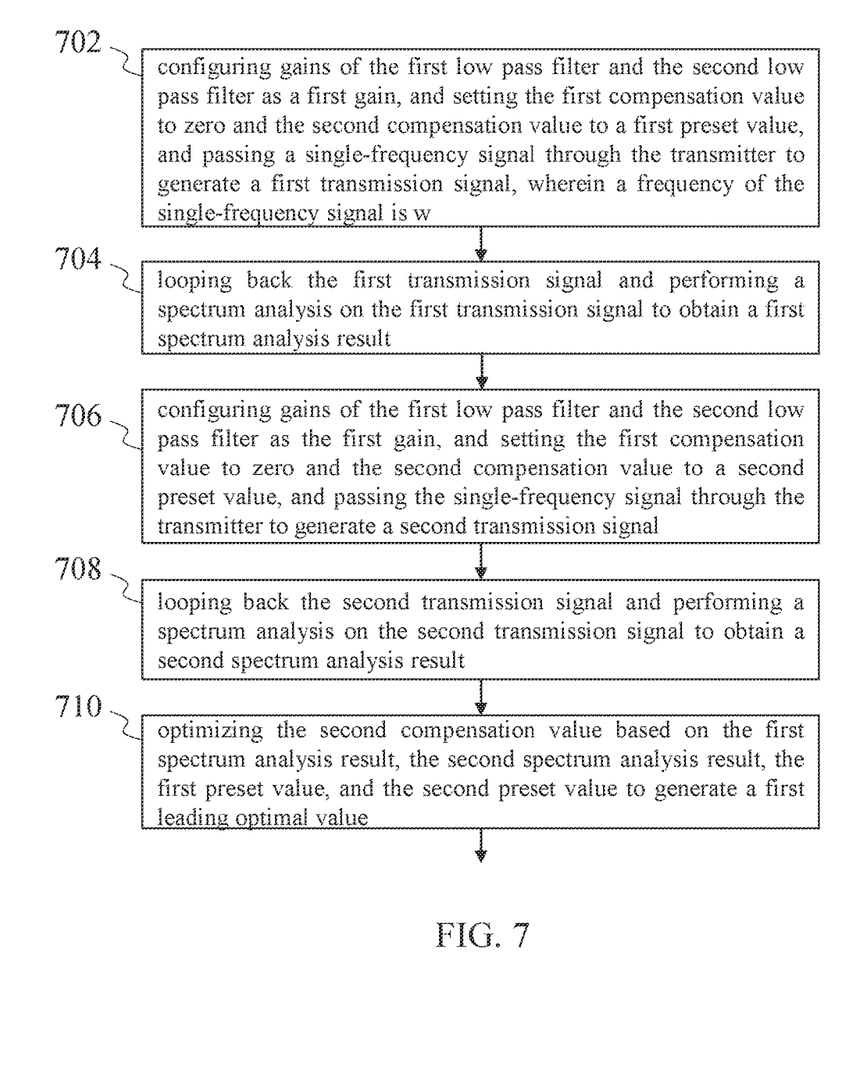
FIG. 7 to FIG. 8 are flow charts illustrating a method for calibrating a transmitter according to a third embodiment of the present application.
Figure 8:
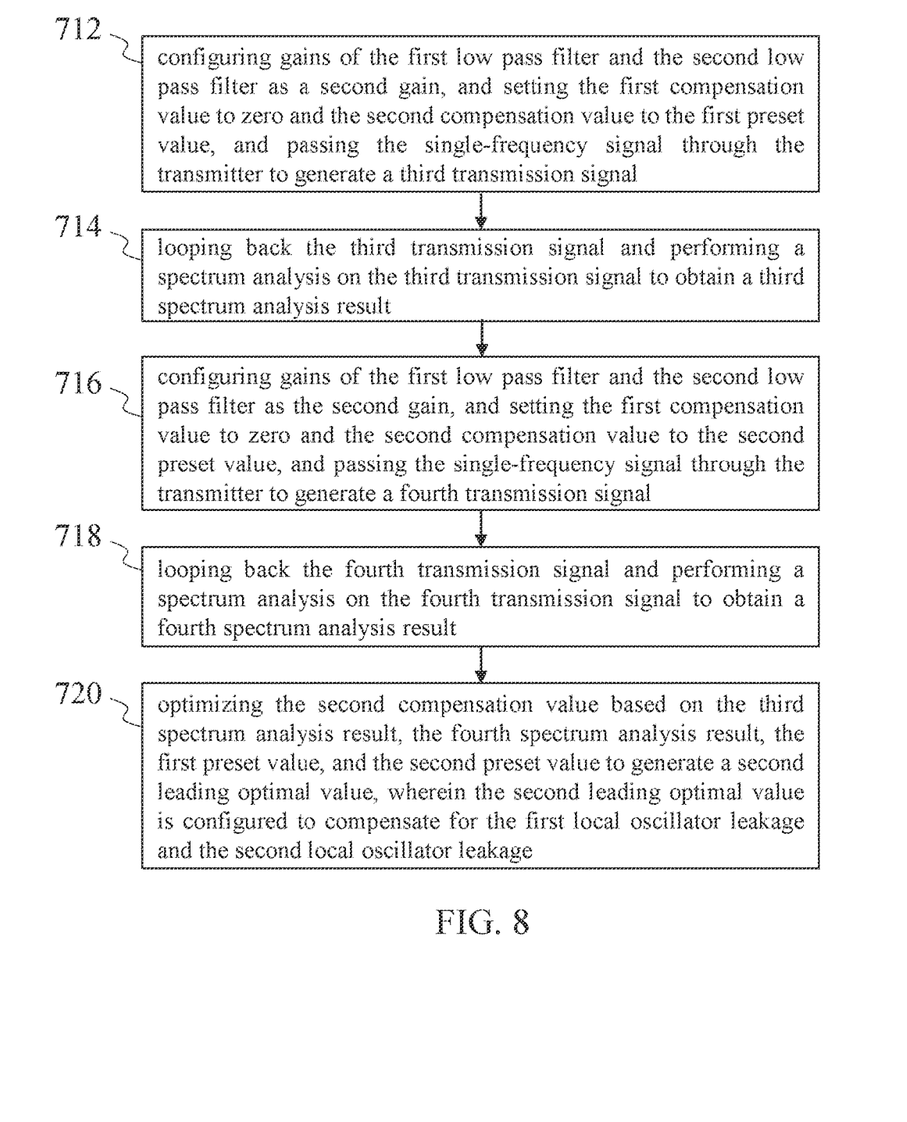

FIG. 7 to FIG. 8 are flow charts illustrating a method for calibrating a transmitter according to a third embodiment of the present application. The transmitter includes an oscillator, a first signal path, and a second signal path, wherein one of the first signal path and the second signal path is an in-phase signal path, the other of the first signal path and the second signal path is a quadrature signal path, the first signal path includes a first low pass filter, the second signal path includes a second low pass filter, the oscillator causes a first local oscillator leakage to a portion of the first signal path preceding the first low pass filter and a portion of the second signal path preceding the second low pass filter, the oscillator causes a second local oscillator leakage to a portion of the first signal path succeeding the first low pass filter and a portion of the second signal path succeeding the second low pass filter, and the first signal path and the second signal path include thereon a first calibration unit and a second calibration unit, wherein the first calibration unit is disposed preceding the first low pass filter and the second low pass filter, the first calibration unit is set with a first compensation value, the second calibration unit is disposed succeeding the first low pass filter and the second low pass filter, and the second calibration unit is set with a second compensation value; the method including: configuring gains of the first low pass filter and the second low pass filter as a first gain, and setting the first compensation value to zero and the second compensation value to a first preset value, and passing a single-frequency signal through the transmitter to generate a first transmission signal, wherein a frequency of the single-frequency signal is w (702); looping back the first transmission signal and performing a spectrum analysis on the first transmission signal to obtain a first spectrum analysis result (704); configuring gains of the first low pass filter and the second low pass filter as the first gain, and setting the first compensation value to zero and the second compensation value to a second preset value, and passing the single-frequency signal through the transmitter to generate a second transmission signal (706); looping back the second transmission signal and performing a spectrum analysis on the second transmission signal to obtain a second spectrum analysis result (708); optimizing the second compensation value based on the first spectrum analysis result, the second spectrum analysis result, the first preset value, and the second preset value to generate a first leading optimal value (710); configuring gains of the first low pass filter and the second low pass filter as a second gain, and setting the first compensation value to zero and the second compensation value to the first preset value, and passing the single-frequency signal through the transmitter to generate a third transmission signal (712); looping back the third transmission signal and performing a spectrum analysis on the third transmission signal to obtain a third spectrum analysis result (714); configuring gains of the first low pass filter and the second low pass filter as the second gain, and setting the first compensation value to zero and the second compensation value to the second preset value, and passing the single-frequency signal through the transmitter to generate a fourth transmission signal (716); looping back the fourth transmission signal and performing a spectrum analysis on the fourth transmission signal to obtain a fourth spectrum analysis result (718); and optimizing the second compensation value based on the third spectrum analysis result, the fourth spectrum analysis result, the first preset value, and the second preset value to generate a second leading optimal value, wherein the second leading optimal value is configured to compensate for the first local oscillator leakage and the second local oscillator leakage (720).

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of embodiments introduced herein. It should be understood that the steps mentioned in the flowchart of the method of the present application can be adjusted in accordance with the actual needs except for those whose sequences are specifically stated, and can even be executed simultaneously or partially simultaneously. In addition, the above-mentioned modules or method steps can be implemented by hardware, software or firmware according to the designer's needs. Those skilled in the art should also realize that such equivalent embodiments still fall within the spirit and scope of the present disclosure, and they may make various changes, substitutions, and alterations thereto without departing from the spirit and scope of the present disclosure.

What is claimed is:

1. A method for calibrating a transmitter, wherein the transmitter includes an oscillator, a first signal path, and a second signal path, wherein one of the first signal path and the second signal path is an in-phase signal path, the other of the first signal path and the second signal path is a quadrature signal path, the first signal path includes a first low pass filter, the second signal path includes a second low pass filter, the oscillator causes a first local oscillator leakage to a portion of the first signal path preceding the first low pass filter and a portion of the second signal path preceding the second low pass filter, the oscillator causes a second local oscillator leakage to a portion of the first signal path succeeding the first low pass filter and a portion of the second signal path succeeding the second low pass filter, and the first signal path and the second signal path includes thereon a first calibration unit and a second calibration unit, wherein the first calibration unit is disposed preceding the first low pass filter and the second low pass filter, the first calibration unit is set with a first compensation value, the second calibration unit is disposed succeeding the first low pass filter and the second low pass filter, and the second calibration unit is set with a second compensation value; the method comprising:

setting the first compensation value to zero and the second compensation value to a first preset value, and passing a single-frequency signal through the transmitter to generate a first transmission signal, wherein a frequency of the single-frequency signal is w;

looping back the first transmission signal and performing a spectrum analysis on the first transmission signal to obtain a first spectrum analysis result;

setting the first compensation value to zero and the second compensation value to a second preset value, and passing the single-frequency signal through the transmitter to generate a second transmission signal;

looping back the second transmission signal and performing a spectrum analysis on the second transmission signal to obtain a second spectrum analysis result;

reversing signs of gains of the first low pass filter and the second low pass filter, setting the first compensation value to zero and the second compensation value to the first preset value, and passing the single-frequency signal through the transmitter to generate a third transmission signal;

looping back the third transmission signal and performing a spectrum analysis on the third transmission signal to obtain a third spectrum analysis result;

reversing signs of gains of the first low-pass filter and the second low-pass filter, setting the first compensation value to zero and the second compensation value to the second preset value, and passing the single-frequency signal through the transmitter to generate a fourth transmission signal;

looping back the fourth transmission signal and performing a spectrum analysis on the fourth transmission signal to obtain a fourth spectrum analysis result; and optimizing the second compensation value based on the first spectrum analysis result, the second spectrum analysis result, the third spectrum analysis result, the fourth spectrum analysis result, the first preset value, and the second preset value to generate an optimal second compensation value.

2. The calibration method of claim 1, wherein the optimal second compensation value is configured to compensate for the second local oscillator leakage and not compensate for the first local oscillator leakage.

3. The calibration method of claim 1, wherein the steps of performing the spectrum analysis on the first transmission signal, the second transmission signal, the third transmission signal, and the fourth transmission signal include performing Fourier transform on the first transmission signal, the second transmission signal, the third transmission signal, and the fourth transmission signal with respect to −w.

4. The calibration method of claim 1, wherein the step of optimizing the second compensation value includes generating the optimal second compensation value based on linear extrapolation or linear interpolation.

5. The calibration method of claim 1, further comprising:
setting the first compensation value to a third preset value and the second compensation value to the optimal second compensation value, and passing the single-frequency signal through the transmitter to generate a fifth transmission signal;
looping back the fifth transmission signal and performing a spectrum analysis on the fifth transmission signal to obtain a fifth spectrum analysis result;
setting the first compensation value to a fourth preset value and the second compensation value to the optimal second compensation value, and passing the single-frequency signal through the transmitter to generate a sixth transmission signal;
looping back the sixth transmission signal and performing a spectrum analysis on the sixth transmission signal to obtain a sixth spectrum analysis result; and
optimizing the first compensation value and generating an optimal first compensation value based on the fifth spectrum analysis result, the sixth spectrum analysis result, the third preset value, and the fourth preset value.

6. The calibration method of claim 5, wherein the optimal first compensation value is configured to compensate for the first local oscillator leakage and not compensate for the second local oscillator leakage.

7. The calibration method of claim 5, wherein the step of optimizing the first compensation value includes generating the optimal first compensation value based on linear extrapolation or linear interpolation.

8. A method for calibrating a transmitter, wherein the transmitter includes an oscillator, a first signal path, and a second signal path, wherein one of the first signal path and the second signal path is an in-phase signal path, the other of the first signal path and the second signal path is a quadrature signal path, the first signal path comprises a first low pass filter, the second signal path comprises a second low pass filter, the oscillator causes a first local oscillator leakage to a portion of the first signal path preceding the first low pass filter and a portion of the second signal path preceding the second low pass filter, the oscillator causes a second local oscillator leakage to a portion of the first signal path succeeding the first low pass filter and a portion of the second signal path succeeding the second low pass filter, and the first signal path and the second signal path include thereon a first calibration unit and a second calibration unit, wherein the first calibration unit is disposed preceding the first low pass filter and the second low pass filter, the first calibration unit is set with a first compensation value, the second calibration unit is disposed succeeding the first low pass filter and the second low pass filter, and the second calibration unit is set with a second compensation value; the method comprising:
setting the first compensation value to a first preset value and the second compensation value to zero, and passing a single-frequency signal through the transmitter to generate a first transmission signal, wherein a frequency of the single-frequency signal is w;
looping back the first transmission signal and performing a spectrum analysis on the first transmission signal to obtain a first spectrum analysis result;
setting the first compensation value to a second preset value and the second compensation value to zero, and passing the single-frequency signal through the transmitter to generate a second transmission signal;
looping back the second transmission signal and performing a spectrum analysis on the second transmission signal to obtain a second spectrum analysis result;
reversing signs of gains of the first low pass filter and the second low pass filter, setting the first compensation value to the first preset value and the second compensation value to zero, and passing the single-frequency signal through the transmitter to generate a third transmission signal;
looping back the third transmission signal and performing a spectrum analysis on the third transmission signal to obtain a third spectrum analysis result;
reversing signs of gains of the first low-pass filter and the second low-pass filter, setting the first compensation value to the second preset value and the second compensation value to zero, and passing the single-frequency signal through the transmitter to generate a fourth transmission signal;
looping back the fourth transmission signal and performing a spectrum analysis on the fourth transmission signal to obtain a fourth spectrum analysis result; and
optimizing the first compensation value based on the first spectrum analysis result, the second spectrum analysis result, the third spectrum analysis result, the fourth spectrum analysis result, the first preset value, and the second preset value to generate an optimal first compensation value.

9. The calibration method of claim 8, wherein the optimal first compensation value is configured to compensate for the first local oscillator leakage and not compensate for the second local oscillator leakage.

10. The calibration method of claim 8, wherein the steps of performing the spectrum analysis on the first transmission signal, the second transmission signal, the third transmission signal, and the fourth transmission signal include performing Fourier transform on the first transmission signal, the second transmission signal, the third transmission signal, and the fourth transmission signal with respect to −w.

11. The calibration method of claim 8, wherein the step of optimizing the first compensation value includes generating the optimal first compensation value based on linear extrapolation or linear interpolation.

12. The calibration method of claim 8, further comprising:
setting the first compensation value to the optimal first compensation value and the second compensation value to a third preset value, and passing the single-frequency signal through the transmitter to generate a fifth transmission signal;

looping back the fifth transmission signal and performing a spectrum analysis on the fifth transmission signal to obtain a fifth spectrum analysis result;

setting the first compensation value to the optimal first compensation value and the second compensation value to a fourth preset value, and passing the single-frequency signal through the transmitter to generate a sixth transmission signal;

looping back the sixth transmission signal and performing a spectrum analysis on the sixth transmission signal to obtain a sixth spectrum analysis result; and optimizing the second compensation value based on the fifth spectrum analysis result, the sixth spectrum analysis result, the third preset value, and the fourth preset value to generate an optimal second compensation value.

13. The calibration method of claim 12, wherein the optimal second compensation value is configured to compensate for the second local oscillator leakage and not compensate for the first local oscillator leakage.

14. The calibration method of claim 12, wherein the step of optimizing the second compensation value includes generating the optimal second compensation value based on linear extrapolation or linear interpolation.

15. A method for calibrating a transmitter, wherein the transmitter includes an oscillator, a first signal path, and a second signal path, wherein one of the first signal path and the second signal path is an in-phase signal path, the other of the first signal path and the second signal path is a quadrature signal path, the first signal path comprises a first low pass filter, the second signal path comprises a second low pass filter, the oscillator causes a first local oscillator leakage to a portion of the first signal path preceding the first low pass filter and a portion of the second signal path preceding the second low pass filter, the oscillator causes a second local oscillator leakage to a portion of the first signal path succeeding the first low pass filter and a portion of the second signal path succeeding the second low pass filter, and the first signal path and the second signal path include thereon a first calibration unit and a second calibration unit, wherein the first calibration unit is disposed preceding the first low pass filter and the second low pass filter, the first calibration unit is set with a first compensation value, the second calibration unit is disposed succeeding the first low pass filter and the second low pass filter, and the second calibration unit is set with a second compensation value; the method comprising:

configuring gains of the first low pass filter and the second low pass filter as a first gain, and setting the first compensation value to zero and the second compensation value to a first preset value, and passing a single-frequency signal through the transmitter to generate a first transmission signal, wherein a frequency of the single-frequency signal is w;

looping back the first transmission signal and performing a spectrum analysis on the first transmission signal to obtain a first spectrum analysis result;

configuring gains of the first low pass filter and the second low pass filter as the first gain, and setting the first compensation value to zero and the second compensation value to a second preset value, and passing the single-frequency signal through the transmitter to generate a second transmission signal;

looping back the second transmission signal and performing a spectrum analysis on the second transmission signal to obtain a second spectrum analysis result; and optimizing the second compensation value based on the first spectrum analysis result, the second spectrum analysis result, the first preset value, and the second preset value to generate a first leading optimal value.

16. The calibration method of claim 15, wherein the first leading optimal value is configured to compensate for the first local oscillator leakage and the second local oscillator leakage.

17. The calibration method of claim 15, wherein the steps of performing the spectrum analysis on the first transmission signal and the second transmission signal include performing Fourier transform on the first transmission signal and the second transmission signal with respect to $-w$.

18. The calibration method of claim 15, wherein the step of optimizing the second compensation value includes generating the first leading optimal value based on linear extrapolation or linear interpolation.

19. The calibration method of claim 15, further comprising:

configuring gains of the first low pass filter and the second low pass filter as a second gain, and setting the first compensation value to zero and the second compensation value to the first preset value, and passing the single-frequency signal through the transmitter to generate a third transmission signal;

looping back the third transmission signal and performing a spectrum analysis on the third transmission signal to obtain a third spectrum analysis result;

configuring gains of the first low pass filter and the second low pass filter as the second gain, and setting the first compensation value to zero and the second compensation value to the second preset value, and passing the single-frequency signal through the transmitter to generate a fourth transmission signal;

looping back the fourth transmission signal and performing a spectrum analysis on the fourth transmission signal to obtain a fourth spectrum analysis result; and optimizing the second compensation value based on the third spectrum analysis result, the fourth spectrum analysis result, the first preset value, and the second preset value to generate a second leading optimal value, wherein the second leading optimal value is configured to compensate for the first local oscillator leakage and the second local oscillator leakage.

20. The calibration method of claim 19, further comprising:

generating an optimal first compensation value and an optimal second compensation value based on the first gain, the second gain, the first leading optimal value, and the second leading optimal value, wherein the optimal first compensation value is configured to compensate for the first local oscillator leakage, and the optimal second compensation value is configured to compensate for the second local oscillator leakage.

* * * * *

UNITED STATES PATENT AND TRADEMARK OFFICE
CERTIFICATE OF CORRECTION

| | | |
|---|---|---|
| PATENT NO. | : 11,664,906 B2 | Page 1 of 1 |
| APPLICATION NO. | : 17/410546 | |
| DATED | : May 30, 2023 | |
| INVENTOR(S) | : Yuan-Shuo Chang and Tzu Ming Kao | |

It is certified that error appears in the above-identified patent and that said Letters Patent is hereby corrected as shown below:

On the Title Page

Item (71) correct the applicant to only list REALTEK SEMICONDUCTOR CORPORATION.

Signed and Sealed this
Fifteenth Day of August, 2023

Katherine Kelly Vidal
*Director of the United States Patent and Trademark Office*